(12) United States Patent
Nübling

(10) Patent No.: US 8,408,467 B2
(45) Date of Patent: Apr. 2, 2013

(54) OPTICAL APPARATUS FOR AN OPTOELECTRONIC SENSOR

(75) Inventor: Ralf Ulrich Nübling, Denzlingen (DE)

(73) Assignee: Sick AG, Waldkirch (DE)

( * ) Notice: Subject to any disclaimer, the term of this patent is extended or adjusted under 35 U.S.C. 154(b) by 158 days.

(21) Appl. No.: 12/897,242

(22) Filed: Oct. 4, 2010

(65) Prior Publication Data

US 2011/0147460 A1 Jun. 23, 2011

(30) Foreign Application Priority Data

Dec. 21, 2009 (DE) ............. 20 2009 017 346 U

(51) Int. Cl.
*G06K 7/10* (2006.01)
(52) U.S. Cl. ............. 235/462.22; 235/454; 235/462.32
(58) Field of Classification Search ............. 235/435, 235/454, 470, 462.22, 462.32
See application file for complete search history.

(56) References Cited

U.S. PATENT DOCUMENTS

| 5,298,729 A * | 3/1994 | Wike, Jr. ............. 235/462.22 |
| 5,361,158 A * | 11/1994 | Tang ............. 235/462.4 |
| 5,484,990 A * | 1/1996 | Lindacher et al. ......... 235/462.22 |
| 6,179,208 B1 * | 1/2001 | Feng ............. 235/472.01 |
| 7,025,271 B2 * | 4/2006 | Dvorkis et al. ............. 235/462.22 |
| 7,367,723 B2 * | 5/2008 | Matusik et al. ............. 396/505 |
| 2004/0118918 A1 * | 6/2004 | Dvorkis et al. ............. 235/454 |

FOREIGN PATENT DOCUMENTS

DE 103 38 472 A1 3/2005

OTHER PUBLICATIONS

German Search Report issued Jul. 5, 2010, in priority German Application No. 20 2009 017 346.1.

* cited by examiner

*Primary Examiner* — Daniel Hess
*Assistant Examiner* — Paultep Savusdiphol
(74) *Attorney, Agent, or Firm* — Nath, Goldberg & Meyer; Jerald L. Meyer; Stanley N. Protigal

(57) ABSTRACT

An optical apparatus (10) for an optoelectronic sensor (100, 200) which has at least one lens (14*a-b*), wherein a further optical element (18) is provided in the beam path of the optical apparatus (10) for extending the depth of field, wherein the optical element (18) is made and/or arranged such that a part of the beam path remains free and thus generates a first depth of field; and wherein the optical element (18) has a planoparallel zone which only covers a part of the beam path of the optical apparatus (10) and thus generates a second depth of field.

26 Claims, 4 Drawing Sheets

Back focal length

OPTICAL APPARATUS FOR AN OPTOELECTRONIC SENSOR

Figure 1:
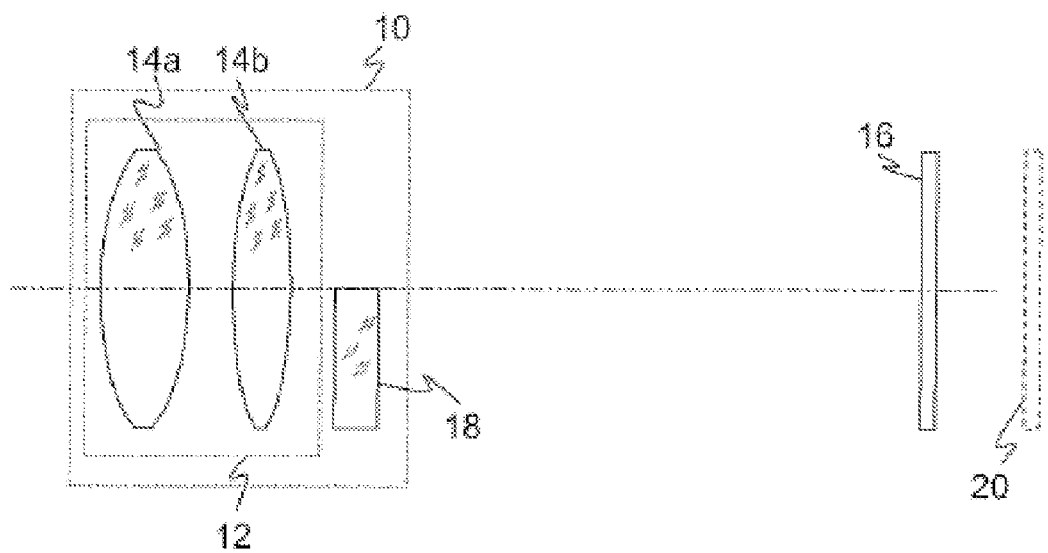

The present disclosure relates to an optical apparatus for an optoelectronic sensor having at least one lens, which has an extended depth of field.

That interval of distances or depth values between an object to be taken and an optoelectronic sensor is called the depth of field (DOF) within which objects are imaged so sharp that the remaining blur is below the resolution of the sensor or at least the resolution of the sensor relevant in the respective application. In common optical imaging systems, there is a focal point of maximum sharpness in which the spatial resolution is usually even substantially higher than required for the application. The depth of field includes the interval at both sides around this focal point up to the boundary at which the sharpness is below the resolution demand preset by the application.

The depth of field is preset via the selection of the optical imaging systems and their focal lengths and f-numbers. A large depth of field can be achieved by smaller apertures and thus less light, so that, conversely, a larger aperture and thus more light is possible with a smaller depth of field.

The optical system of the sensor has only a limited depth of field. An extension of the depth of field by smaller apertures results in light losses. If the detection range should be extended with this energetic disadvantage, either the blurred images have to be accepted or an adjustment of focus has to be made.

With code-reading sensors, that is, for example, barcode scanners or camera-based code readers for one-dimensional and two-dimensional codes, a sharp image reproduction is necessary for an error-free decoding. This applies at the reception side, for example in the recording of image files, but can also play a role at the transmission side, for example to focus the sampling ray of a scanning code reader.

Conventionally, autofocus systems are therefore used which focus the objective on the object distance on the basis of an external or an integrated distance determination. Autofocus systems are, however, complex and/or expensive and additionally relatively prone to servicing due to their moving parts.

It is also known to extend the depth of field without a focus adjustment in that lenses with two or more focal zones are used. The manufacture of such multizone lenses, however, requires very complex calculations and the multizone lenses are very much bound to the application. Multizone lenses are only suitable for imaging work with one lens or at least with few lenses. High-resolution mass-produced objectives with such lenses are not available.

A system is known from U.S. Pat. No. 5,748,371 for extending the depth of field in which a mask is arranged in front of an imaging lens, said mask locally influencing the phase of the incident light. The redistribution by means of wavefront encoding of the mask thus made as a phase plate provides that the optical transfer function remains substantially constant over a greater depth range around the focal point. A subsequent digital image processing inverts the optical changes introduced by the mask to restore the actual image. The mask thus has a microstructure which has to be calculated and manufactured with great precision. The image is highly distorted by the mask and can only be used after complex digital postprocessing.

It is therefore desired to provide a possibility for the extension of the depth of field using static, inexpensive optical elements.

This object is satisfied by an optical device in which a further optical element is provided in the beam path of the optical apparatus for extending the depth of field, arranged such that a part of the beam path remains free and thus generates a first depth of field. The optical element has a planoparallel zone which only covers a part of the beam path of the optical apparatus and thus generates a second depth of field. The approach starts from the basic idea that the spatial resolution at the focal point is typically substantially higher than the evaluation limit, that is the sharpness required for the application. This unused maximum sharpness can be distributed to the margins of the original depth of field to increase the resolution there and thus to extend the depth of field which results overall. For this purpose, a portion of the available light passes through the objective or the optical apparatus without any further influencing. Another portion of the available light has a different optical path length due to a manipulation in the beam path, namely an optical element with a planoparallel zone, so that two depths of field arise overall.

The disclosed technology has the advantage that a static optical element can be used which is in this respect extremely simple and inexpensive. A microstructure is not necessary. The extended depth of field is created on the basis of a geometrical effect due to different optical path lengths. Unevenness in the order of magnitude of the wavelength such as are utilized in a phase plate, for example, do not play any role in this respect.

A complex and/or expensive autofocus can be dispensed with. The optical element has no design influence on the objective as such so that existing objectives or standard objectives can be used. The embodiment and arrangement of the optical element allow great flexibility for a variety of demands of the application.

The optical element is preferably arranged so that approximately half of the beam path remains free. A symmetrical redistribution thereby takes place by the optical element in which half of the light is imaged as in an optical device without an optical element. The definition is therefore distributed particularly uniformly in the new depth of field which is made up of the first and second depths of field. Alternatively, a 50:50 distribution is directly deviated from. Distance dynamics, that is different imaging properties at different distances, are thus compensated via areas of the planoparallel zone selected with different sizes.

The optical element is preferably made as a planoparallel plate. The planoparallel zone thus extends over the total optical element. The plate is either smaller than the cross-section of the beam path at the location of the optical element, or the plate is only partly pushed into the beam path. A planoparallel plate does not require any special production techniques.

In an alternative approach, a planoparallel zone is likewise provided instead of a free part of the beam path. In this process, a sensor is created in which the optical element has a first planoparallel zone and a second planoparallel zone, with the first planoparallel zone and the second planoparallel zone each only covering a part of the beam path of the optical apparatus and thus generating a first depth of field and a second depth of field. The basic idea is the same. Different optical path lengths are generated for different portions of the light in the beam path; only here, in contrast to the approach in which a further optical element is provided in the beam path of the optical apparatus, the light portions for both the first depth of the field and the second depth of field pass through the optical element. The disclosed technique can be implemented only with an offset of the depths of field which is caused by the smaller optical path extension caused by the first planoparallel zone or by the second planoparallel zone.

The first planoparallel zone and the second planoparallel zone in this respect preferably each cover approximately half the beam path and thus together substantially the total beam path of the optical apparatus. The total available light is thus distributed symmetrically and thus a resolution is achieved which is as uniform as possible over the depths of field.

In a preferred further development, the optical element has at least one additional planoparallel zone which only covers a part of the beam path of the optical apparatus and thus generates at least one additional depth of field. In accordance with the same basic idea as with two different path lengths, whether caused by one free zone and one planoparallel zone or by two planoparallel zones, a third zone, and possibly further zones, are then introduced to extend the depth of field even more. All part zones preferably have the same surface portion of the available cross-sectional area of the beam path for a uniform redistribution.

The planoparallel zones are preferably made such that the depths of field overlap to form a common extended depth of field. The depth of field is common or contiguous when the intermediate spacings between the resolution maxima, that is the focal positions with respect to the individual planoparallel zones and, optionally, the free zone, are likewise still imaged with sufficient sharpness. This can be defined more precisely with reference to the modulation transfer function (MTF). If there is only one spacing interval in which the MTF remains above a resolution threshold demanded by the application, a common depth of field results. It is also conceivable that a plurality of disjunctive depths of field are created. This is only of interest for specific applications since there is then no uniform, contiguous distance zones in which the image is sharp enough.

The planoparallel zones preferably have mutually different thicknesses and/or refractive indices. These are two simple possibilities to manipulate the optical path length. With a constant refractive index, as a rule that is with one and the same material, the desired optical path length can be designed solely by the shape. Conversely, it is possible with two or more materials of different refractive indices to form the optical element with a constant thickness at all points. Mixed forms are also conceivable.

The optical apparatus is preferably made as a mass-produced objective with a plurality of lenses. High-resolution mass-produced objectives cannot be combined with conventional multizone lenses, but can very well be combined with the disclosed optical element. The advantages of a high-resolution mass-produced objective can thus be effectively combined in this manner with the advantages of a multizone lens without its disadvantages.

The optical element is preferably arranged so close to the lens of the optical apparatus that the lens still does not have any spatially resolving influence on the image. The optical apparatus thus detects every location with light portions from every planoparallel zone and, optionally, from the free zone.

At least one planoparallel zone preferably has an additional optical property, in particular a color filtering or a reduced light transmission. This optical property then only acts on a portion of the light and provides additional degrees of freedom with application-specific adaptations.

In one configuration, an optoelectronic sensor is provided which has a light receiver which has an optical apparatus. The optical apparatus then enables a taking of images using an image sensor or the reception of image signals using a photodiode with an extended depth of field.

In a further preferred further development, an optoelectronic sensor is provided which has one light transmitter with which an optical apparatus is associated. Transmission acoustics can thus advantageously be influenced; a desired diameter can in particular be obtained for a laser beam over a larger depth of field. It is also conceivable to associate common optical apparatus or one respective optical apparatus in an optoelectronic sensor both with the light transmitter and the light receiver.

The sensor is preferably made as a laser scanner, in particular as a code-reading sensor. Sensors of this type are frequently used over a reception zone with larger distance variation, for example for the reading of codes in a conveying plant with packages or other objects which differ greatly in their sizes and shapes.

The sensor can also advantageously be made as a camera, in particular as a code-reading camera. Autofocus cameras are frequently used here, due to the large distance variation, which can be used statically by the optical apparatus. Sharp images are thus created over an extended detection zone whose code content is securely encodable.

Figure 2:
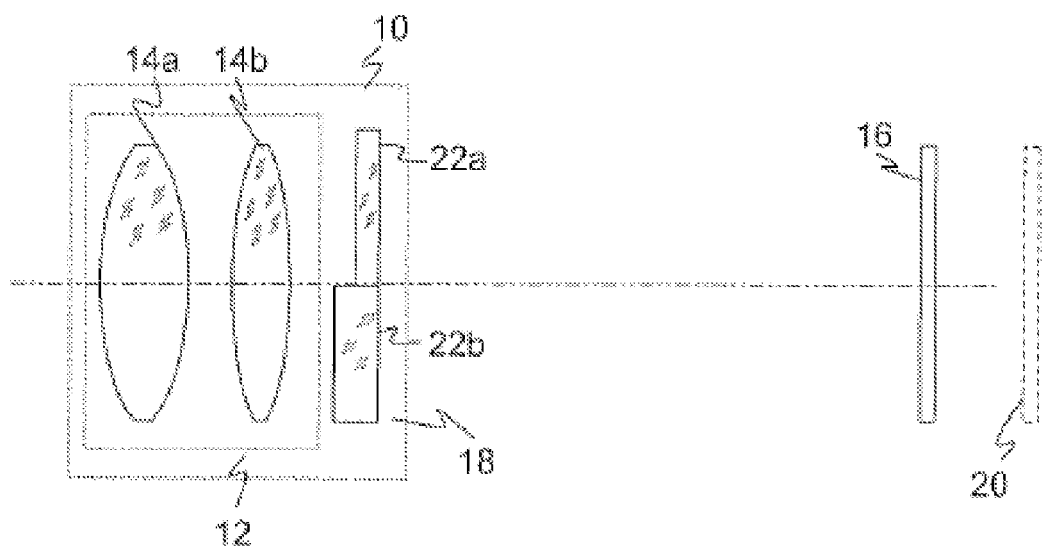
Figure 3:
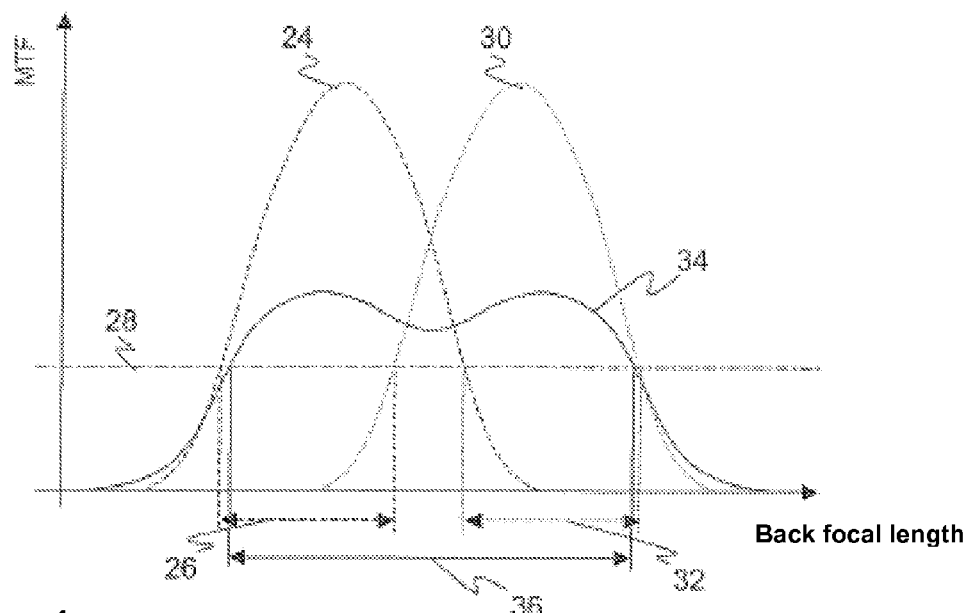
Figure 4:
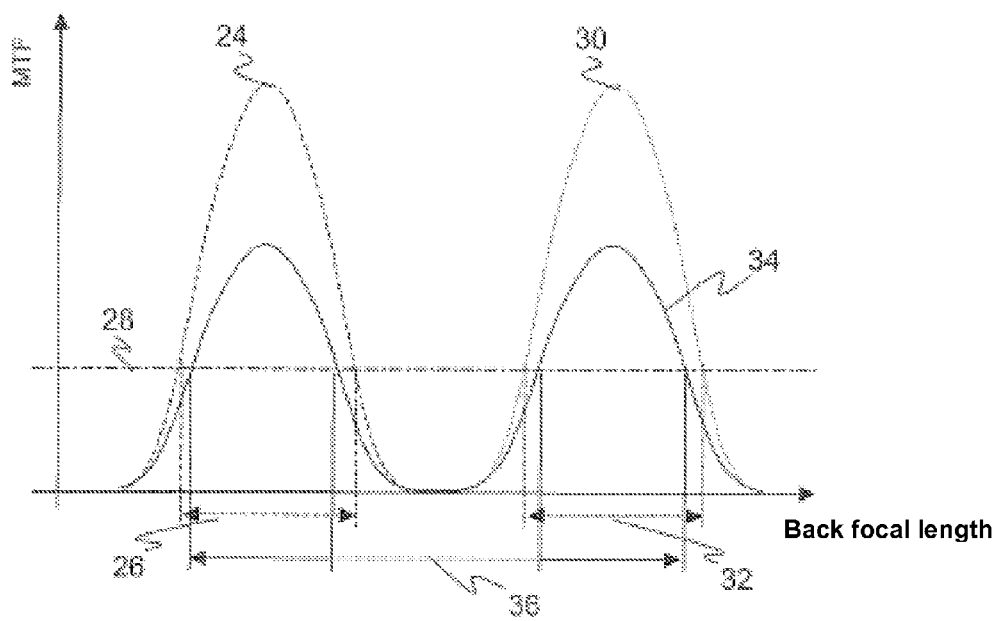
Figure 5:
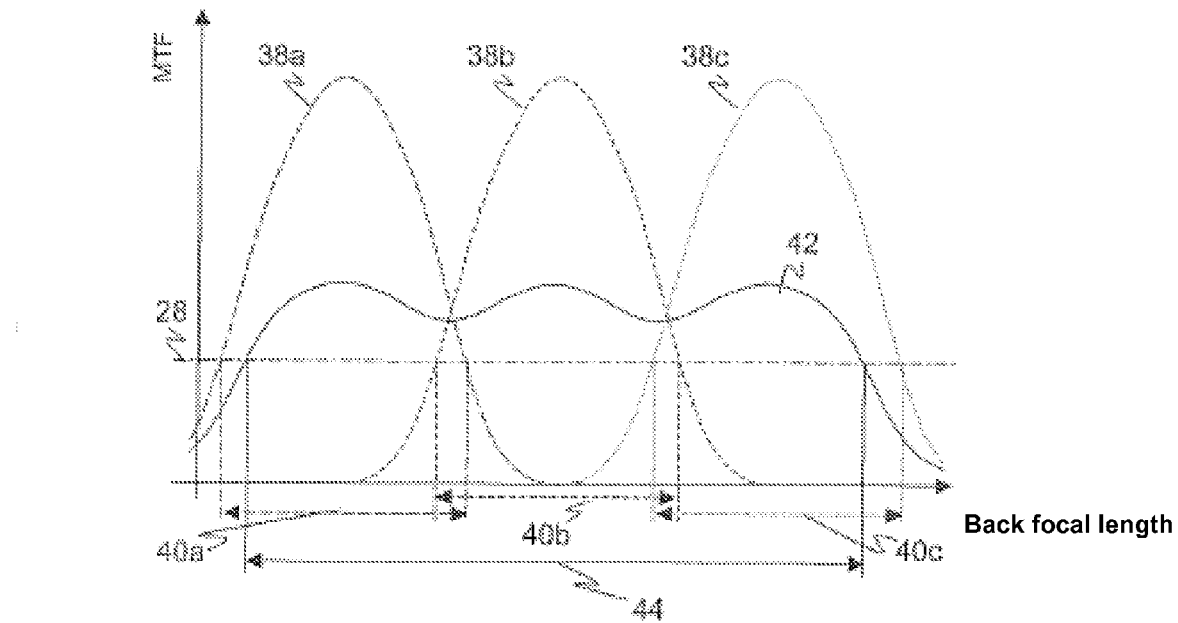
Figure 6:
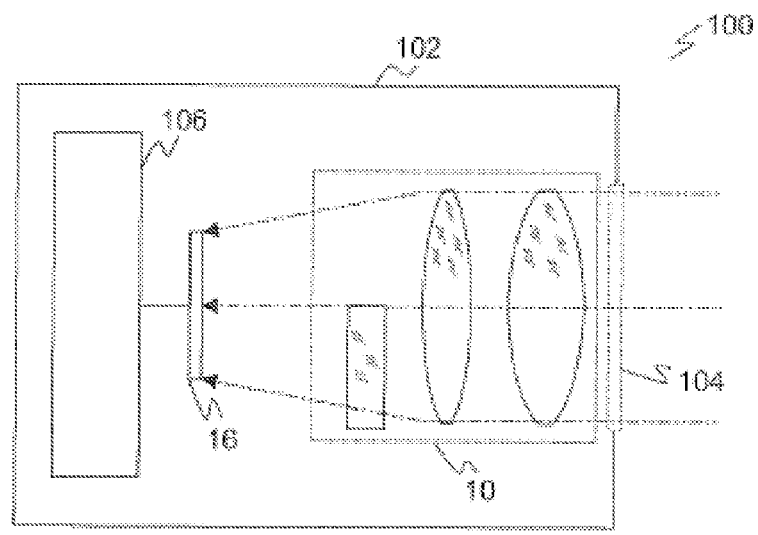
Figure 7:
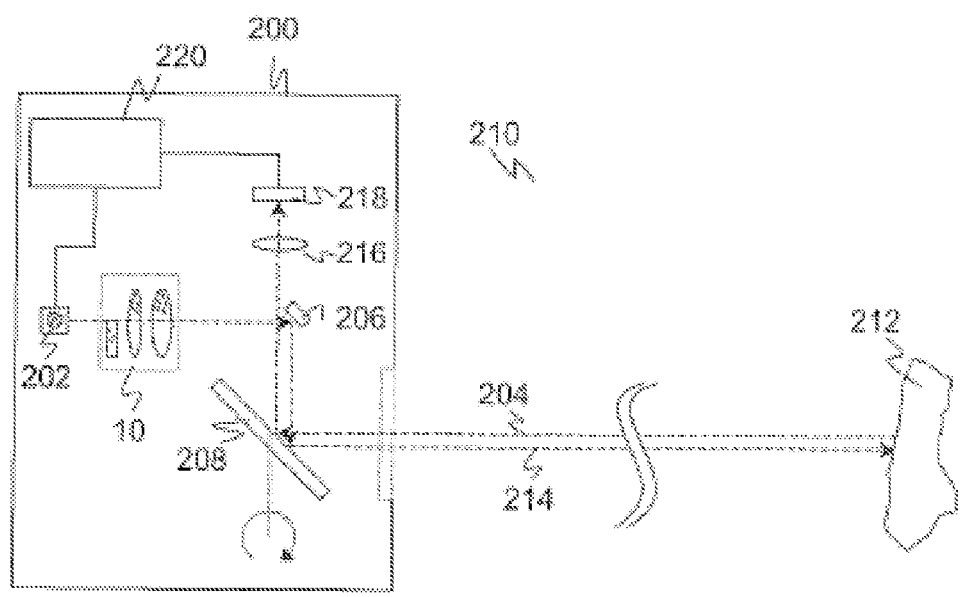

The disclosed technology will also be explained in the following with respect to further advantages while referring to the enclosed drawing and to embodiments. The Figures of the drawing show in:

FIG. 1 a schematic sectional representation through a first embodiment of an optical apparatus with an optical element which only covers a part of the beam path:

FIG. 2 a schematic sectional representation through a second embodiment of an optical apparatus which has two planoparallel part zones of different thicknesses;

FIG. 3 a representation of the modulation transfer function (MTF) over the back focal length on extension of the depth of field of two original depths of field to one common depth of field;

FIG. 4 a representation in accordance with FIG. 3, with two disjunctive depths of field being created in the extension;

FIG. 5 a representation in accordance with FIG. 3, with one common depth of field arising from three original depths of field;

FIG. 6 a simplified sectional representation of an optoelectronic sensor made as a code-reading camera and having an optical apparatus at the reception side; and FIG. 7 a simplified sectional representation of an optoelectronic sensors made as a laser scanner and having an optical apparatus at the transmission side.

FIG. 1 shows a schematic sectional representation through a first embodiment of an optical apparatus 10 having an objective 12 which has two lenses 14a-b. The representation of the objective 12 is purely exemplary. Both simpler lenses up to a single converging lens and high-resolution mass-produced lenses having three, four or even more lenses can be used. A reception element 16 is provided behind the objective 12 and is made, for example, as a photodiode or as an image sensor having a linear or a matrix-type CCD or CMOS chip.

An optical element 18 is arranged between the objective 12 and the reception element 15 close to the lenses 14a-b, that is at a position at which the objective does not yet have any spatially resolving influence on the image. It is alternatively conceivable to arrange the optical element 18 between the lenses 14a-b or in front of the objective 12, that is on the side remote from the reception element 16.

The optical element 18 in this embodiment comprises a planoparallel plate made from a transparent material, for example form a glass plate or a plastic plate. The optical element 18 is arranged centrally in the received beam path such that one half of the received light passes through the optical element 18 and the other half of the beam path remains free. The received light is manipulated in this process with the help of the optical element 18 such that spatially separated optical zones with different optical path lengths are produced. The point of maximum sharpness is thus split over two reception planes, which results in an extension of the depth of field.

The reception element 16 is arranged in the reception plane of the objective 12 not displaced by the optical element 18. The reception plane is displaced for a portion of the received light, as shown by a dashed fictitious position 20 of the reception vv element. The optical element 18 therefore generates a new, second image plane which differs from the original image plane.

FIG. 2 shows a second embodiment of the optical apparatus 10. Here and in the following, the same reference numerals label the same features. The embodiment differs in the embodiment of the optical element 18 which has two planoparallel zones 22a-b of different thicknesses. Different optical path lengths are also produced in this manner for light portions which pass through less material optically denser with respect to air in the thinner planoparallel zone 22a than in the thicker planoparallel zone 22b. Consequently, a second image plane 20 is created for the portion of light which passes through the lower planoparallel zone 22b, said second image plane being offset with respect to the reception plane of the upper planoparallel zone 22a.

The first and second embodiments are conceptionally very similar and merge into one another in a borderline case when the thinner planoparallel zone 22a is mentally set at zero. It is the difference in the optical path length, that is the thickness difference between the planoparallel zones 22a-b which is decisive for the extension of the depth of field. To the extent that optical properties of the optical element 18 do not differ over the total beam path of the objective 12, as is the case for common thickness portions, an offset of the depth of field arises at most which can be compensated by changes in the objective 12 and not an extension of the depth of field.

Alternatively to different thicknesses of the planoparallel zones 22a-b, different refractive indices are also conceivable with the same thickness or mixed forms of both different thicknesses and different refractive indices.

The effect on the depth of field is explained in FIG. 3. Modulation transfer functions (MTF) are entered with respect to the back focal length there. Units are not necessary for the explanation of the basic principle and are therefore not drawn in.

In a fictitious situation in which differently to FIGS. 1 and 2 no optical element 18 is located in the beam path of the objective 12, the curve drawn with the dashed line 24 arises. The associated depth of field 26 is defined as that interval of the back focal length of the image in which the modulation transfer function exceeds a resolution threshold 28 demanded by the application. In a quite analog manner, in a fictitious situation in which an optical element 18 was used with a planoparallel zone covering the total beam path of the objective 12, the curve drawn by a dotted line 30 is created with an associated depth of field 32. The depths of field 26 and 32 only differ from one another by an offset in an idealized situation.

If the optical element 18 in accordance with FIG. 2 is now arranged in the beam path of the objective 12, a superimposed modulation transfer function 34 with an associated depth of field 36 results drawn with solid lines. The maxima of the superimposed modulation transfer function 34 are admittedly less pronounced that the maxima of the individual modulation transfer functions 24, 30. The image back focal length interval in which the superimposed modulation transfer function 34 exceeds the resolution threshold 28 is, however, substantially enlarged. The high image sharpness of the individual modulation transfer functions 24, 30, which is not required at all, is thus redistributed to the margins in favor of an extended depth of field 36.

FIG. 4 shows a situation in which the optical element 18 has a larger difference in the optical path lengths between the free zones and the optical element 18 or between the two planoparallel part zones 22a-b. As a consequence, the two individual modulation transfer functions 24, 30 move apart. Expressed differently, the two image planes 16, 20 would have a larger offset in FIGS. 1 and 2.

The extended depth of field in this respect falls apart into two disjunctive part zones. This can be beneficial in some applications, for example when very near and very far objects have to be imaged, but not objects at intermediate distances. As a rule, however, one will endeavor to design the optical element 18 by selection of thickness, refractive index and surface portion of the planoparallel zones so that the situation of FIG. 4 with disjunctive depths of field is avoided in favor of a common extended depth of field as in FIG. 3.

FIG. 5 again shows a different situation in which the optical element 18 has an additional planoparallel part zone. Starting from the embodiment of FIG. 1, it would have two planoparallel zones having different optical path lengths and is arranged so that a part zone of the beam path of the objective 12 remains free or, starting from FIG. 2, three planoparallel zones each having different optical path lengths. The fictitious situation can again be considered in which only a respective one of the optical path lengths is for the total cross-sectional surface of the beam path of the objective 12. This is represented by three individual modulation transfer functions 38a-c and associated depths of field 40a-c. In the superimposed position, a superimposed modulation transfer function 42 arises having an again extended associated depth of field 44. A plurality of disjunctive depths of field could also arise here depending on the embodiment of the individual planoparallel zones. A conceivable extension to further additional planoparallel zones takes place quite analogously.

FIG. 6 shows an optoelectronic sensor 100 made as a camera and having an optical apparatus 10. The sensor 100 is here accommodated by way of example in a housing 102 with a front screen 104.

The sensor 100 generates image data with the increased depth of field by means of the reception element 16 and further processes them in an evaluation unit 106. The camera is, for example, mounted over a conveyor belt and generates images of packets which run past and which bear a three-dimensional or two-dimensional code. The evaluation unit 106 then evaluates the image information and outputs the code information in clear text or in an otherwise agreed data format.

FIG. 7 shows a laser scanner 200 as a further example of an optoelectronic sensor in which the optical apparatus 10 can be used. A light transmitter 202 having a laser light source generates a transmitted light beam 204 whose beam is shaped by an optical apparatus 10. The transmitted light beam 204 is directed via a deflection mirror 206 onto a rotating mirror 208 and from there into a detection zone 210. After reflection at an object 212, the light returns as a received light beam 214 via the rotating mirror 208 and an optical receiving system 216 to a light reception element 218. The received light is there converted into an electric signal and is further processed in an evaluation unit 220. For this purpose, the distance of the object 212 is calculated, for example, with reference to the time of flight of the transmitted and received light beam 294, 214, or the sampling information is read out as a code, in particular as a barcode.

The optical apparatus 10 is used at the transmission side in the laser scanner 200 for influencing the beam acoustics. Equally, however, the alternative or additional use of the optical apparatus 10 in the reception path would also be possible. The laser scanner 200 can, for example be made as a distance-measuring sensor to take surface reliefs or contour images of a scene or as a code reader.

The invention claimed is:

1. An optical apparatus (10) for an optoelectronic sensor (100, 200) which has at least one lens (14a-b), wherein a further optical element (18) is provided in the beam path of the optical apparatus (10) for extending the depth of field, wherein the optical element (18) is made and/or arranged such that a part of the beam path remains free and thus generates a first depth of field; and wherein the optical element (18) has a planoparallel zone which only covers a part of the beam path of the optical apparatus (10) and thus generates a second depth of field.

2. An optical apparatus (10) in accordance with claim 1, wherein the optical element (18) is arranged such that approximately half the beam path remains free.

3. An optical apparatus (10) in accordance with claim 1, wherein the optical element (18) is made as a planoparallel plate.

4. An optical apparatus in (10) accordance with claim 1, wherein the optical element (18) has at least one additional planoparallel zone which only covers a part of the beam path of the optical apparatus (10) and thus generates at least one additional depth of field.

5. An optical apparatus (10) in accordance with claim 1, wherein the planoparallel zones (18, 22a-b) are made such that the depths of field are superimposed on one another to form a common extended depth of field (36).

6. An optical apparatus (10) in accordance with claim 1, wherein the planoparallel zones (22a-b) have mutually different thicknesses and/or refractive indices.

7. An optical apparatus (10) in accordance with claim 1 which is made as a mass-produced objective with a plurality of lenses (14a-b).

8. An optical apparatus (10) in accordance with claim 1, wherein the optical element (18) is arranged so close to the lens (14a-b) of the optical apparatus (10) that the lens (14a-b) still has no spatially resolving influence on the image.

9. An optical apparatus (10) in accordance with claim 1, wherein at least one planoparallel zone (18, 22-b) has an additional optical property, in particular a color filtering or a reduced light transmission.

10. An optical apparatus (10) for an optoelectronic sensor (100, 200) which has at least one lens (14a-b), wherein a further optical element (18) is provided in the beam path of the optical apparatus (10) for extending the depth of field, wherein the optical element (18) has a first planoparallel zone (22a) and a second planoparallel zone (22b), with the first planoparallel zone (22a) and the second planoparallel zone (22b) each only covering a part of the beam path of the optical apparatus (10) and thus generating a first depth of field and a second depth of field.

11. An optical apparatus (10) in accordance with claim 10, wherein the first planoparallel zone (22a) and the second planoparallel zone (22b) each cover approximately half of the beam path and thus together substantially the total beam path of the optical apparatus (10).

12. An optical apparatus in (10) accordance with claim 10, wherein the optical element (18) has at least one additional planoparallel zone which only covers a part of the beam path of the optical apparatus (10) and thus generates at least one additional depth of field.

13. An optical apparatus (10) in accordance with claim 10, wherein the planoparallel zones (18, 22a-b) are made such that the depths of field are superimposed on one another to form a common extended depth of field (36).

14. An optical apparatus (10) in accordance with claim 10, wherein the planoparallel zones (22a-b) have mutually different thicknesses and/or refractive indices.

15. An optical apparatus (10) in accordance with claim 10 which is made as a mass-produced objective with a plurality of lenses (14a-b).

16. An optical apparatus (10) in accordance with claim 10, wherein the optical element (18) is arranged so close to the lens (14a-b) of the optical apparatus (10) that the lens (14a-b) still has no spatially resolving influence on the image.

17. An optical apparatus (10) in accordance with claim 10, wherein at least one planoparallel zone (18, 22-b) has an additional optical property, in particular a color filtering or a reduced light transmission.

18. An optoelectronic sensor (100, 200) having a light receiver (16) with which an optical apparatus (10) is associated, the optical apparatus (10) having at least one lens (14a-b), wherein a further optical element (18) is provided in the beam path of the optical apparatus (10) for extending the depth of field, wherein the optical element (18) is made and/or arranged such that a part of the beam path remains free and thus generates a first depth of field; and wherein the optical element (18) has a planoparallel zone which only covers a part of the beam path of the optical apparatus (10) and thus generates a second depth of field.

19. A sensor (200) in accordance with claim 18, which is made as a laser scanner, in particular as a code-reading scanner.

20. A sensor (100) in accordance with claim 18, which is made as a camera, in particular as a code-reading camera.

21. An optoelectronic sensor (100, 200) having a light transmitter (202) with which an optical apparatus (10) is associated, the optical apparatus (10) having at least one lens (14a-b), wherein a further optical element (18) is provided in the beam path of the optical apparatus (10) for extending the depth of field, wherein the optical element (18) is made and/or arranged such that a part of the beam path remains free and thus generates a first depth of field; and wherein the optical element (18) has a planoparallel zone which only covers a part of the beam path of the optical apparatus (10) and thus generates a second depth of field.

22. A sensor (200) in accordance with claim 21, which is made as a laser scanner, in particular as a code-reading scanner.

23. An optoelectronic sensor (100, 200) having a light receiver (16) with which an optical apparatus (10) is associated, the optical apparatus (10) at least one lens (14a-b), wherein a further optical element (18) is provided in the beam path of the optical apparatus (10) for extending the depth of field, wherein the optical element (18) has a first planoparallel zone (22a) and a second planoparallel zone (22b), with the first planoparallel zone (22a) and the second planoparallel zone (22b) each only covering a part of the beam path of the optical apparatus (10) and thus generating a first depth of field and a second depth of field.

24. A sensor (200) in accordance with claim 23, which is made as a laser scanner, in particular as a code-reading scanner.

25. An optoelectronic sensor (100, 200) having a light transmitter (202) with which an optical apparatus (10) is associated, the optical apparatus (10) at least one lens (14a-b), wherein a further optical element (18) is provided in the beam path of the optical apparatus (10) for extending the depth of field, wherein the optical element (18) has a first planoparallel zone (22*a*) and a second planoparallel zone (22*b*), with the first planoparallel zone (22*a*) and the second planoparallel zone (22*b*) each only covering a part of the beam path of the optical apparatus (10) and thus generating a first depth of field and a second depth of field.

26. A sensor (200) in accordance with claim 25, which is made as a laser scanner, in particular as a code-reading scanner.

* * * * *